(12) United States Patent
Yoshimoto et al.

(10) Patent No.: US 9,755,861 B2
(45) Date of Patent: Sep. 5, 2017

(54) POWER LINE COMMUNICATION SYSTEM AND MASTER COMMUNICATION DEVICE

(71) Applicant: DENSO CORPORATION, Kariya, Aichi-pref. (JP)

(72) Inventors: Takahisa Yoshimoto, Nagoya (JP); Hironobu Akita, Okazaki (JP); Toshihiko Matsuoka, Nukata-gun (JP)

(73) Assignee: DENSO CORPORATION, Kariya (JP)

( * ) Notice: Subject to any disclaimer, the term of this patent is extended or adjusted under 35 U.S.C. 154(b) by 280 days.

(21) Appl. No.: 14/748,514

(22) Filed: Jun. 24, 2015

(65) Prior Publication Data

US 2015/0381391 A1 Dec. 31, 2015

(30) Foreign Application Priority Data

Jun. 26, 2014 (JP) ................................. 2014-131348

(51) Int. Cl.
| | |
|---|---|
| *H02J 1/00* | (2006.01) |
| *H04L 25/02* | (2006.01) |
| *H04B 3/54* | (2006.01) |
| *H04L 5/14* | (2006.01) |

(52) U.S. Cl.
CPC ........... *H04L 25/0272* (2013.01); *H04B 3/54* (2013.01); *H04B 2203/5487* (2013.01); *H04L 5/14* (2013.01)

(58) Field of Classification Search
CPC ......... H04L 25/0272; H04L 5/14; H04B 3/54; H04B 2203/5487
See application file for complete search history.

(56) References Cited

U.S. PATENT DOCUMENTS

2010/0296560 A1* 11/2010 Sadan ...................... H04B 3/56
375/222
2013/0320862 A1* 12/2013 Campbell .............. H05B 37/02
315/152

FOREIGN PATENT DOCUMENTS

JP 2007-174429 A 7/2007

* cited by examiner

*Primary Examiner* — Daniel Cavallari
(74) *Attorney, Agent, or Firm* — Posz Law Group, PLC (57) ABSTRACT

A power line communication system includes a master side transceiver of a master communication device, a slave side transceiver of a slave communication device, a power wire, and a ground wire. The master communication device includes a voltage changeover portion changing supply voltage in steps. The master side transceiver is connected to the slave side transceiver through the power wire and the ground wire. The slave side transceiver transmits first information to the master side transceiver by a differential transmission. The voltage changeover portion changes the supply voltage so as the master side transceiver to transmit second information to the slave side transceiver. A master communication device includes a master side transceiver and a voltage changeover portion.

13 Claims, 9 Drawing Sheets

POWER LINE COMMUNICATION SYSTEM AND MASTER COMMUNICATION DEVICE

CROSS REFERENCE TO RELATED APPLICATION

This application is based on Japanese Patent Application No. 2014-131348 filed on Jun. 26, 2014, the disclosure of which is incorporated herein by reference.

TECHNICAL FIELD

The present disclosure relates to a power line communication system and a master communication device. In the power line communication system, the master communication device is connected to a slave communication device through a power wire and a ground wire. The power line communication system transmits information from the slave communication device to the master communication device by a differential transmission.

BACKGROUND

Patent literature 1: JP 2007-174429A

Conventionally, a power line communication (PLC) system is known. In the power line communication system, a master communication device and a slave communication device are connected through a power wire and a ground wire, and information is transmitted from the slave communication device to the master communication device by a differential transmission. In this kind of the PLC system, the information is transmitted only in a single direction from the slave communication device to the master communication device.

The inventors of the present application have found the following.

In order to perform a full-duplex communication between a slave communication device and a master communication device, another communication line different from the power wire and the ground wire may be added to the communication system. A circuit size as a device may increase accompanied with an addition of another communication line. Patent literature 1 discloses a wiring system that performs a full-duplex communication by multiplexing signals.

A technology described in patent literature 1 is not applied to a power line communication system.

SUMMARY

It is an object of the present disclosure to provide a power line communication system and a master communication device. The power line communication system enables to perform a full-duplex communication while avoiding an addition of a communication line as a system.

According to one aspect of the present disclosure, a power line communication system includes a master side transceiver of a master communication device, a slave side transceiver of a slave communication device, a power wire, and a ground wire. The master communication device includes a voltage changeover portion that changes supply voltage supplied to the power wire in a plurality of steps. The master side transceiver is connected to the slave side transceiver through the power wire and the ground wire. The slave side transceiver transmits first information to the master side transceiver by a differential transmission. The voltage changeover portion changes the supply voltage to the power wire in the plurality of steps so as the master side transceiver to transmit second information to the slave side transceiver.

According to another aspect of the present disclosure, a master communication device is provided. The master communication device includes a master side transceiver and a voltage changeover portion. The master side transceiver is connected to a slave side transceiver of a slave communication device through a power wire and a ground wire. The voltage changeover portion changes supply voltage, which is supplied to the power wire, in multiple steps. The slave side transceiver transmits first information to the master side transceiver by a differential transmission. The voltage changeover portion changes the supply voltage to the power wire in the multiple steps so as the master side transceiver to transmit second information to the slave side transceiver.

According to the power line communication system and the master communication device, while avoiding an addition of a communication line as a system, it may be possible to concurrently perform the transmission of information from the slave side transceiver to the master side transceiver and the transmission of information from the master side transceiver and the slave side transceiver and therefore, to perform a full duplex communication.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

First Embodiment

A first embodiment will be explained with referring to FIG. 1 to FIG. 8C. In the first embodiment, a present disclosure is applied to a power line communication system that transmits image information of an electronic mirror mounted to a vehicle. The power line communication system 1 includes a master communication device 2 and two slave communication devices 3, 4. The master communication device 2 corresponds to, for example, a device that is assembled to the inside of an instrument panel. Each of the two slave communication devices 3, 4 corresponds to, for example, a device assembled to an electronic mirror, which is attached to a vehicle body symmetrically.

Figure 1:
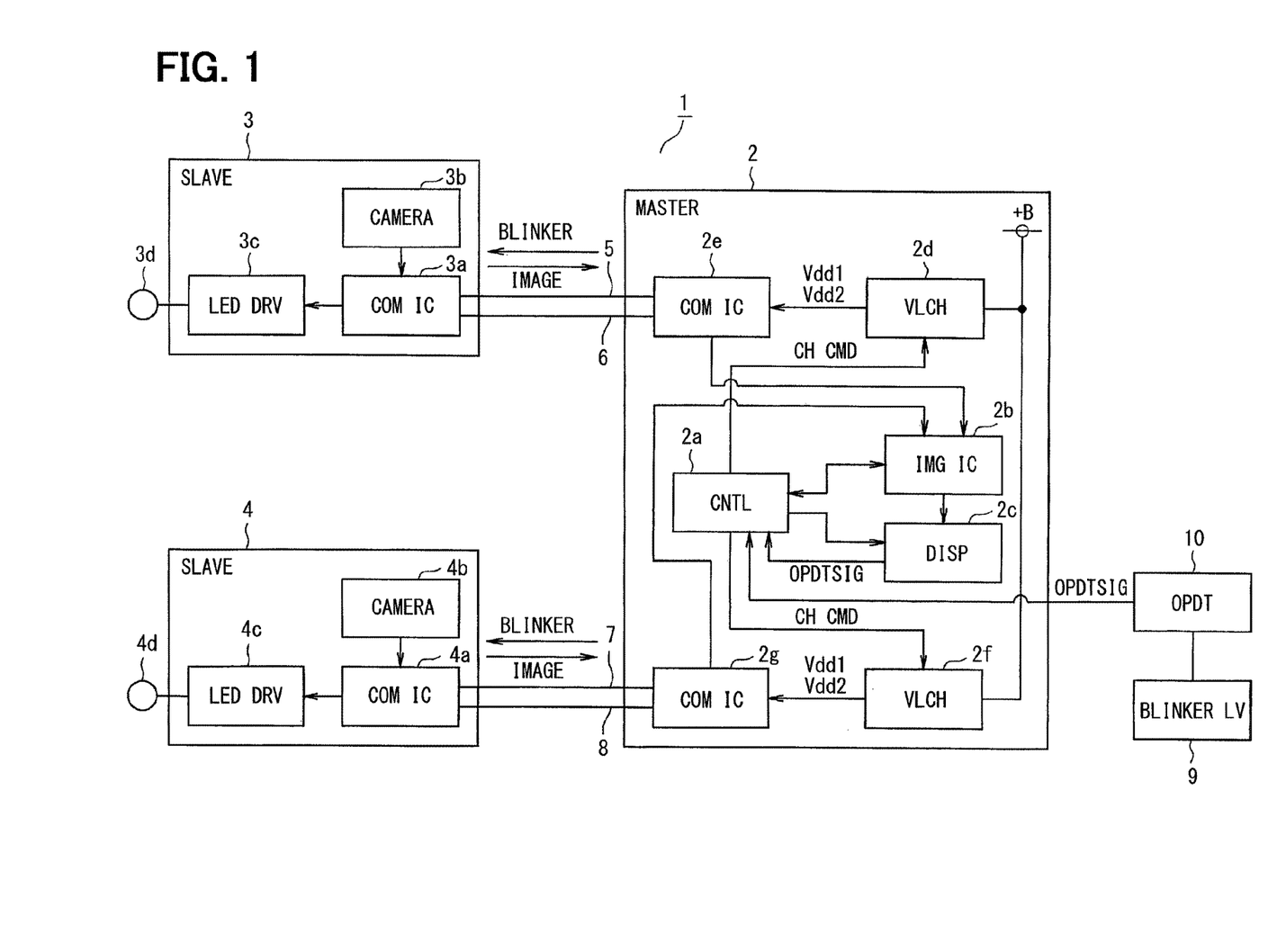
FIG. 1 is a block diagram illustrating a first embodiment.

The master communication device 2 and the slave communication device 3 are connected through a power wire (also referred to as a power source line) 5 and a ground wire (also referred to as a ground line) 6. In addition, the master communication device 2 and the slave communication device 4 are connected through the power wire 7 and a ground wire 8. Hereinafter, it is supposed that the slave communication device 3 corresponds to a device that is assembled to an electronic mirror provided to a left side (for example, a left door) of the vehicle body, and the slave communication device 4 corresponds to a device that is assembled to an electronic mirror provided to a right side (for example, a right door) of the vehicle body, as an example.

The master communication device 2 includes a control portion 2a, an image processing integrated circuit (IC) 2b, a display portion 2c, a voltage changeover circuit 2d, a communication IC 2e, a voltage changeover circuit 2f, and a communication IC 2g. Incidentally, the control portion 2a corresponds to a control information generation portion, a display control portion, a first operation specifying portion, and a second operation specifying portion. The image processing IC 2b corresponds to an image processing portion. The display portion 2c corresponds to a display portion. The voltage changeover circuit 2d and the voltage changeover circuit 2f correspond to a voltage changeover portion. The communication IC 2e and the communication IC 2g correspond to a master side transceiver. Incidentally, the master side transceiver may also be referred to as a master side transmission and reception portion. The voltage changeover circuit 2d and the communication IC 2e are used for transmitting information between the master communication device 2 and the slave communication device 3. The voltage changeover circuit 2f and the communication IC 2g are used for transmitting information between the master communication device 2 and the slave communication device 4.

The control portion 2a includes a microcomputer having a central processing unit (CPU), a read only memory (ROM), a random access memory (RAM), or the like. The control portion 2a causes the CPU to execute a control program stored in the ROM so as to control an operation of the master communication device 2. The control portion 2a receives an operation detection signal from an operation detection portion 10. The operation detection portion 10 detects an operation of a blinker lever 9. When the blinker lever 9 is rotated from a neutral position to a left turn position by an operation of a user (e.g. a driver), the control portion 2a receives the operation detection signal indicating a rotation of the blinker lever 9 to the left turn position from the operation detection portion 10. Then, when the blinker lever 9 is returned from the left turn position to the neutral position, the control portion 2a receives the operation detection signal indicating a restore of the blinker lever 9 to the neutral position from the operation detection portion 10. Similarly, when the blinker lever 9 is rotated from the neutral position to a right turn position by an operation of the user, the control portion 2a receives an operation detection signal indicating a rotation to the right turn position from the operation detection portion 10. When the blinker lever 9 is returned from the right turn position to the neutral position, the control portion 2a receives the operation detection signal indicating a restore to the neutral position from the operation detection portion 10.

The slave communication device 3 transmits image information (corresponding to first information) to the communication IC 2e. When the image processing IC 2b receives the image information transmitted to the communication IC 2e, the image processing IC 2b performs image processing on the received image information. When the image processing IC 2b performs the image processing on the image information, the image processing IC 2b specifies a blanking period when the image information is not transmitted from the slave communication device 3 to the communication IC 2e. The image processing IC 2b notifies the specified blanking period to the control portion 2a. The slave communication device 4 also transmits image information to the communication IC 2g. When the image processing IC 2b receives the image information transmitted to the communication IC 2g, the image processing IC 2b performs image processing on the received image information. When the image processing IC 2b performs the image processing on the image information, the image processing IC 2b specifies a blanking period when the image information is not transmitted from the slave communication device 4 to the communication IC 2g. The image processing IC 2b notifies the specified blanking period to the control portion 2a. The control portion 2a transfers an image obtained by the image processing by the image processing IC 2b to the display portion 2c.

The display portion 2c includes a liquid crystal display (LCD) having a display area with a predetermined screen resolution (the number of pixels in vertical and horizontal directions). The display portion 2c displays the image transferred from the image processing IC 2b. The display portion 2c has a function receiving an operation that a user performs on a screen. The function receiving the operation that a user performs on a screen may be referred to as a touch panel function. When the user touches the screen with a finger, the display portion 2c detects an event that the user touches the screen with the finger by, for example, an electrostatic capacitance type. The display portion 2c outputs an operation detection signal indicating a position where the finger touches the screen or a time when the finger touches screen. Incidentally, a type detecting the event that the user touches the screen with finger is not limited to the electrostatic capacitance type, and another type such as a resistance membrane type and an inductive coupling type may be used.

The voltage changeover circuit 2d includes a step down circuit that receives an output voltage (for example, 12 V) of a vehicle battery mounted to the vehicle, steps down the output voltage of the vehicle voltage to a predetermined voltage, and outputs the predetermined voltage. The voltage changeover circuit 2d changes the output voltage based on a changeover command inputted from the control portion 2a. While the voltage changeover circuit 2d receives a first changeover command from the control portion 2a, the voltage changeover circuit 2d maintains and outputs the output voltage (Vdd1) of the vehicle battery (without stepping down the output voltage of the vehicle battery by the step down circuit) to the communication IC 2e. On the contrary, while the voltage changeover circuit 2d receives a second changeover command from the control portion 2a, the voltage changeover circuit 2d steps down the output voltage of the vehicle battery by the step down circuit and outputs the output voltage (Vdd2) to the communication IC 2e. Incidentally, since the output voltage has been stepped down, the Vdd2 is less than the Vdd1. The voltage changeover circuit 2f has a similar configuration to the voltage changeover circuit 2d, and changes the output voltage based on a changeover command inputted from the control portion 2a. Incidentally, a voltage difference between the Vdd1 and the Vdd2 may be determined considering, for example, power consumption and electric field radiation. It may be preferable that amplitude is large considering a noise tolerance from the external portion. The voltage difference may be several hundred millivolts to several volts considering that power consumption increases in proportion to the square of the amplitude and frequency and that electric field radiation from a transmission line increases.

The communication IC 2e performs transmission of the image information from the communication IC 3a in the slave communication device 3 with the differential transmission using the output voltage supplied from the voltage changeover circuit 2d as a center potential of the power wire 5. When the output voltage supplied from the voltage changeover circuit 2d is equal to the Vdd1, the communication IC 2e performs the transmission of the image information from the communication IC 3a in the slave communication device 3 by the differential transmission having the center potential of the power wire 5 as the Vdd1. When the output voltage supplied from the voltage changeover circuit 2d is equal to Vdd2, the communication IC 2e performs the transmission of the image information from the communication IC 3a in the slave communication device 3 by the differential transmission having the center potential of the power wire 5 as the Vdd2. Incidentally, the communication IC 2g has a configuration similar to the communication IC 2e. The communication IC 2g performs transmission of the image information from the communication IC 4a in the slave communication device 4 by the differential transmission having the output voltage supplied from the voltage changeover circuit 2f as the center potential of the power wire 7.

The communication device 3 includes a communication IC 3a that transmits information with the master communication device 3, a camera 3b, and a LED drive circuit 3c. The communication IC 3a corresponds to a slave side transceiver. Incidentally, the slave side transceiver may also be referred to as a slave side transmission and reception portion. The camera 3b corresponds to an imaging portion. The LED drive circuit 3c corresponds to a drive portion. The camera 3b corresponds to an imaging element including a charge coupled device (CCD) sensor, a complementary metal-oxide semiconductor (CMOS) sensor, or the like. The camera 3b images a left rear side of the vehicle as an image visual field, and outputs the imaged image information to the communication IC 3a. The image visual field of the camera 3b is set to be wider than the display area of the display portion 2c.

When the communication IC 3a receives the image information from the camera 3b, the communication IC 3a transmits the received image information to the communication IC 2e in the master communication device 2 by the differential transmission. The LED drive circuit 3c controls ON/OFF (a turning on and off) of a LED 3d, which is installed to a blinker (a left turn direction indicator) for a left turn. The LED 3d corresponds to a drive object and a light emitting device. Specifically, the LED drive circuit 3c has a timer function that measures ON period and OFF period of the LED 3d respectively. While a signal inputted from the communication IC 3a is equal to a high level "1", the LED drive circuit 3c operates the timer function and performs a blinking control by which ON/OFF of the LED 3d are periodically performed repeatedly. While the signal inputted from the communication IC 3a is equal to a low level "0", the LED drive circuit 3c does not perform the timer function and does not perform the blinking control by which ON/OFF of the LED 3d are periodically performing repeatedly. The slave communication device 3 includes a function transmitting the image information that the camera 3b has imaged the left rear side of the vehicle to the master communication device 2 and a function performing the blinking control of the LED 3d installed to the blinker for the left turn.

The slave communication device 4 has a configuration similar to the slave communication device 3. The slave communication device 4 includes a communication IC 4a that transmits information with the master communication device 2, a camera 4b, and a LED drive circuit 4c. The communication IC 4a corresponds to the slave side transceiver. The camera 4b corresponds to the imaging portion. The LED drive circuit 4c corresponds to the drive portion. The camera 4b images a right rear side of the vehicle as the image visual field. The image visual field of the camera 4b is set to be wider than a display area of the display portion 2c. The communication device 4 includes a function transmitting the image information that the camera 4b has imaged the right rear side of the vehicle to the master communication device 2 and a function performing the blinking control of the LED 4d installed to the blinker for a right turn. The LED 4d corresponds to the drive object and the light emitting device.

The communication IC 2e and the communication IC 2g in the master communication device 2 and the communication IC 3a in the slave communication device 3 and the communication IC 4a in the slave communication device 4 will be explained. Incidentally, since a relationship between the communication IC 2e in the master communication device 2 and the communication IC 3a in the slave communication device 3 is similar to a relationship between the communication IC 2g in the master communication device 2 and the communication IC 4a in the slave communication device 4, the relationship between the communication IC 2e in the master communication device 2 and the communication IC 3a in the slave communication device will be explained hereinafter.

Figure 2:
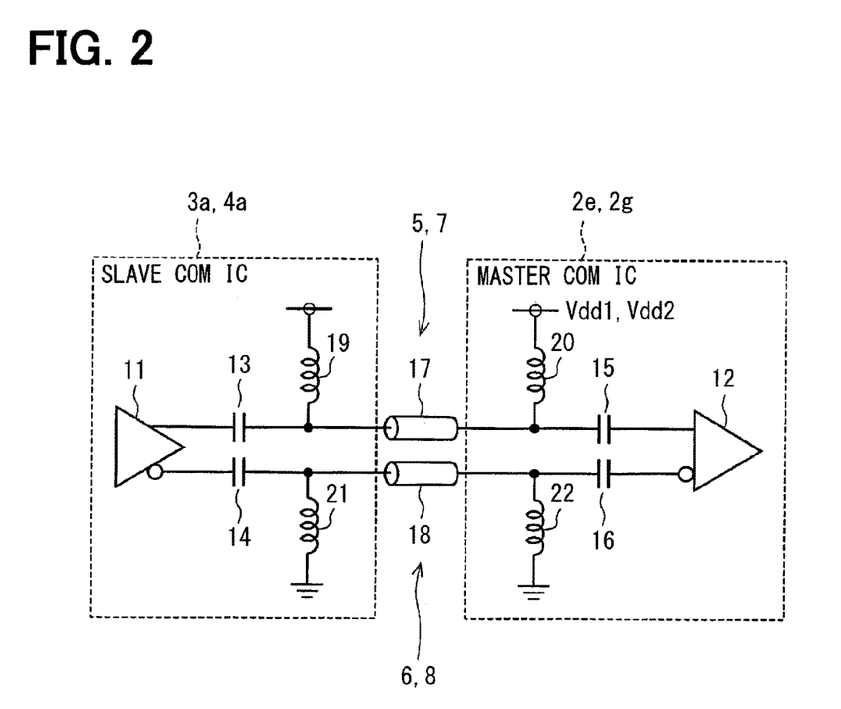
FIG. 2 is a diagram illustrating a circuit configuration of a driver and a receiver.

As illustrated in FIG. 2, the communication IC 3a in the slave communication device 3 has a driver 11. The communication IC 2e in the master communication device 2 has a receiver 12. The driver 11 and the receiver 12 correspond to the differential transmission. Transmission and reception terminals of the driver 11 are connected to transmission lines 17, 18 through coupling capacitors 13, 14, respectively. Transmission and reception terminals of the receiver 12 are connected to transmission lines 17, 18 through coupling capacitors 15, 16, respectively. A connection point between the coupling capacitor 13 and the transmission line 17 is connected to a power supply voltage side through an inductor 19. A connection point between the coupling capacitor 15 and the transmission line 17 is connected to the power supply voltage side through an inductor 20. A connection point between the coupling capacitor 14 and the transmission line 18 is connected to a ground side through an inductor 21. A connection point between the coupling capacitor 16 and the transmission line 18 is connected to the ground side through an inductor 22. Incidentally, the Vdd1 or the Vdd2, which correspond to the output voltage from the voltage changeover circuit 2d, is selectively supplied as power supply voltage.

Figure 3:
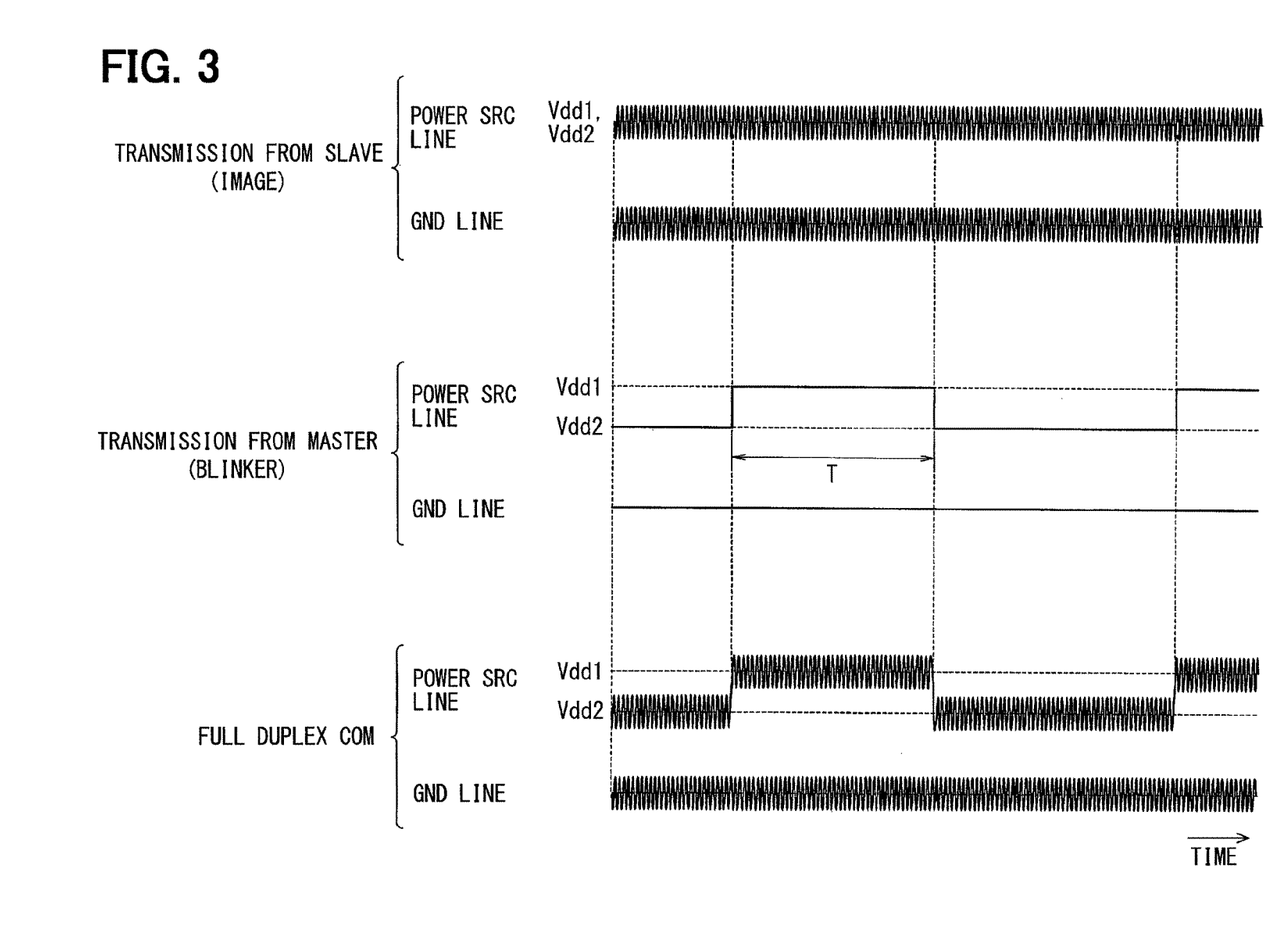
FIG. 3 is a diagram illustrating a waveform of a signal corresponding to a transmission from a slave communication device, a waveform of a signal corresponding to a transmission from a master communication device and a full-duplex communication.

According to this configuration, as illustrated in FIG. 3, the image information (a bit string including "1" and "0") is transmitted from the slave communication device 3 (corresponding to the driver 11 in the communication IC 3a) to the master communication device 2 (corresponding to the receiver 12 in the communication IC 2e) by the differential transmission. Accordingly, the image information obtained by the camera 3b is transmitted from the slave communication device 3 to the master communication device 2, the image processing IC 2b performs the image processing on the image information, and the display portion 2c displays the image after the image processing. Incidentally, a symbol of "T" in FIG. 3, FIG. 4A, FIG. 4C, FIG. 9, FIG. 10A, and FIG. 10C means a ON period of the blinker signal.

Transmission of blinker information (including "1" and "0") from the master communication device 2 (corresponding to the receiver 12 in the communication IC 2e) to the slave communication device 3 (corresponding to the driver 11 in the communication IC 3a) is performed by changing supply voltage supplied to the power wire 5. The blinker information corresponds to second information. Specifically, in the master communication device 2, while the control portion 2a detects the blinker lever 9 is positioned to the neutral position, the control portion 2a outputs the second changeover command to the voltage changeover circuit 2d. When the voltage changeover circuit 2d receives the second changeover command from the control portion 2a, the voltage changeover circuit 2d supplies the Vdd2 to the communication IC 2e. In this case, the receiver 12 in the communication IC 2e receives the Vdd2, and the driver 11 in the communication IC 3a also receives the Vdd2 through the transmission line 17. In this case, the slave communication device 3 transmits the image information to the master communication device 2 by the differential transmission having the Vdd2 as the center potential. In addition, the blinker information of 0 is transmitted from the master communication device 2 to the slave communication device 3 since the supply voltage to the power wire 5 is equal to the Vdd2. Therefore, while the master communication device 2 transmits the blinker information of 0 to the slave communication device 3, the LED drive circuit 3c does not perform the blinking control by which the LED 3d is repeatedly turned ON/OFF periodically.

Figure 4A:
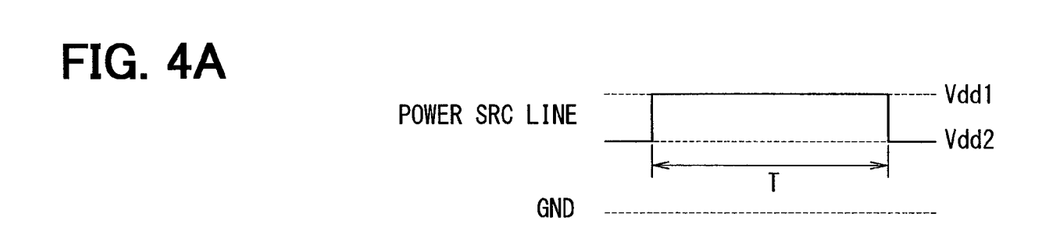
FIG. 4A is a diagram illustrating a waveform of blinker information.
Figure 4B:
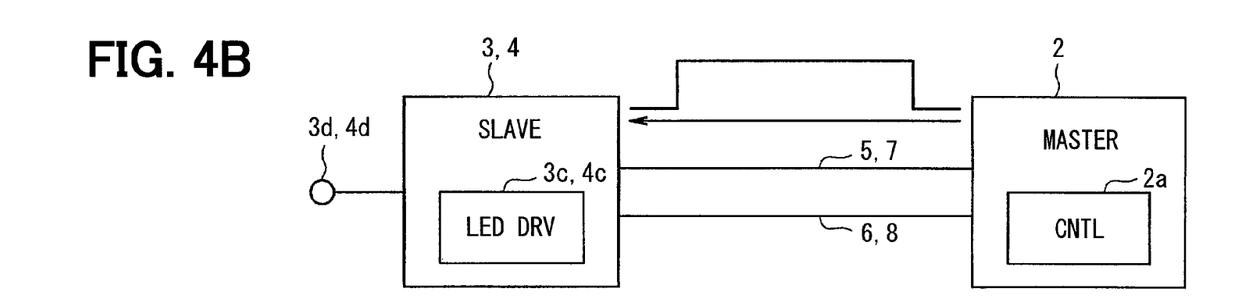
FIG. 4B is a diagram illustrating the waveform of blinker information and a blinking cycle of a LED.
Figure 4C:
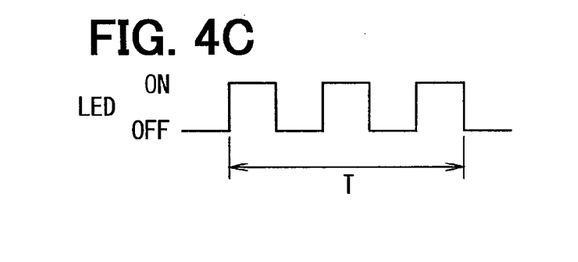
FIG. 4C is a diagram illustrating the blinking cycle of a LED.

When the blinker lever 9 is rotated from the neutral position to the left turn position and the control portion 2a detects the blinker lever 9 is positioned to the left turn position, the control portion 2a outputs the first changeover command to the voltage changeover circuit 2d. When the voltage changeover circuit 2d receives the first changeover command from the control portion 2a, the voltage changeover circuit 2d supplies the Vdd1 to the communication IC 2e. In this case, the receiver 12 in the communication IC 2e is supplied with the Vdd1, and the driver 11 in the communication IC 3a is also supplied with the Vdd1 through the transmission line 17. In this case, the image information is transmitted from the slave communication device 3 to the master communication device 2 by the differential transmission having the Vdd1 as the center potential. In addition, the blinker information of 1 is transmitted from the master communication device 2 to the slave communication device 3 since the supply voltage to the power wire 5 is equal to the Vdd1. Therefore, while the blinker information of 1 is transmitted from the master communication device 2 to the slave communication device 3, the LED drive circuit 3c performs the blinking control by which the LED 3d is repeatedly turned ON/OFF periodically as illustrated in FIG. 4A to FIG. 4C.

Incidentally, the period when the master communication device 2 transmits the blinker information of "1" to the slave communication device 3 may correspond to a case where a changeover period is valid, and the period when the master communication device 2 transmits the blinker information of "0" to the slave communication device 3 may correspond to a case where the changeover period is invalid.

Thus, the image information is transmitted from the slave communication device 3 to the master communication device 2, and concurrently, the blinker information is transmitted from the master communication device 2 to the slave communication device 3. That is, the full-duplex communication is performed. Incidentally, the transmission of the image information is asynchronous with the transmission of the blinker information. The control portion 2a may output the first changeover command to the voltage changeover circuit 2d at the initial time when the image processing IC 2b notifies the blanking period after the blinker lever 9 is rotated from the neutral position to the left turn position. The control portion 2a may output the second changeover command to the voltage changeover circuit 2d at the initial time when the image processing IC 2b notifies the blanking period after the blinker lever 9 is returned from the left turn position to the neutral position. When the supply voltage to the power wire 5 is changed between the Vdd1 and the Vdd2, since direct current component in a signal changes, a bit error may occur in the image information which is transmitted from the slave communication device 3 to the master communication device 2, and a malfunction such as a case where a noise overlaps an image may occur in a whole system. In order to avoid the case, the blanking period is provided. Due to the blanking period, a bit error may not effect on the whole system even when the bit error occurs. By changing the supply voltage to the power wire 5 between the Vdd1 and the Vdd2 at the blanking period when the image information is not transmitted, it may be possible to prevent a malfunction such as a case where a noise overlaps an image from occurring as the whole system.

A display control of an image performed by the master communication device 2 will be explained. In the master communication device 2, the control portion 2a changes a display mode of the image based on the operation detection signal inputted from the display portion 2c and the operation detection signal inputted from the operation detection portion 10. As described in FIG. 5, the image visual field of the cameras 3b, 4b is wider than the display area of the display portion 2c. Data amount included in the image information transmitted from the slave communication devices 3, 4 to the master communication device 2 is greater than data amount corresponding to the display area of the display portion 2c. Therefore, the control portion 2a uses this situation, and the control portion 2a changes the display mode of the image.

Figure 6A:
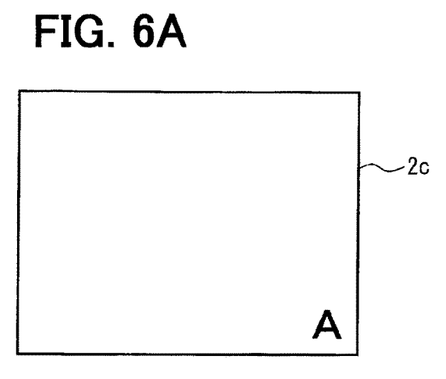
FIG. 6A is a diagram illustrating an example to change a display mode of an image.
Figure 6B:
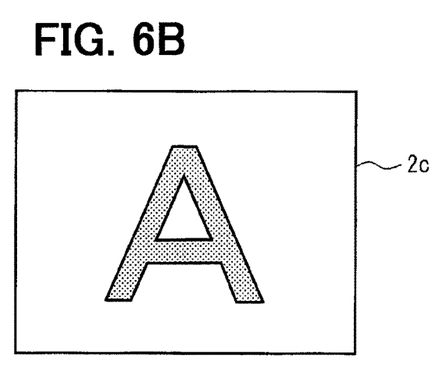
FIG. 6B is a diagram illustrating an example to change a display mode of an image.
Figure 7A:
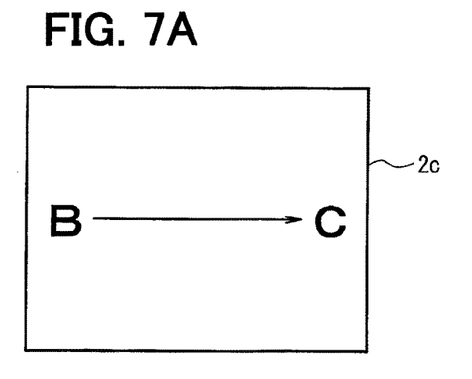
FIG. 7A is a diagram illustrating another example to change the display mode of the image.
Figure 7B:
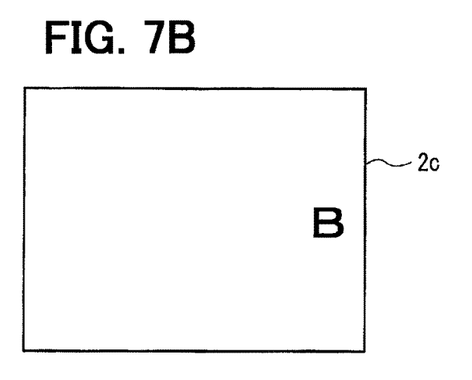
FIG. 7B is a diagram illustrating another example to change the display mode of the image.
Figure 8A:
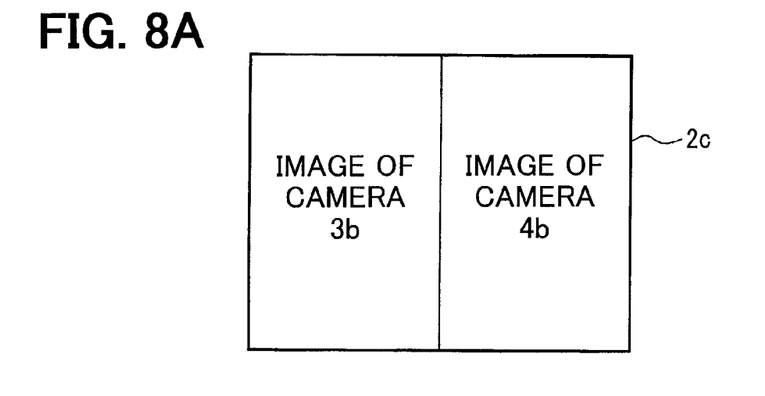
FIG. 8A is a diagram illustrating another example to change the display mode of the image.
Figure 8B:
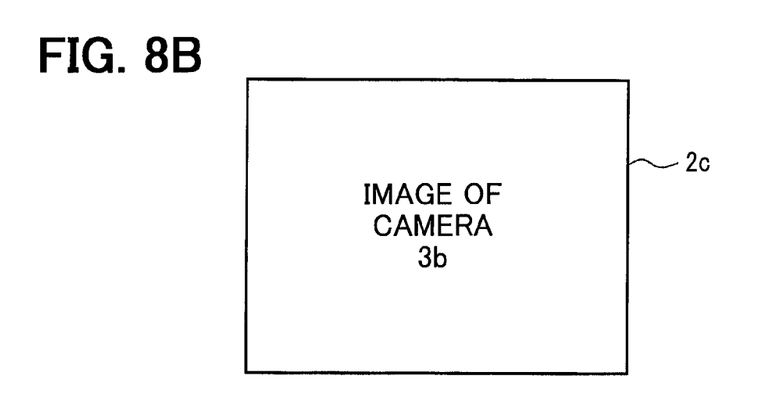
FIG. 8B is a diagram illustrating another example to change the display mode of the image.
Figure 8C:
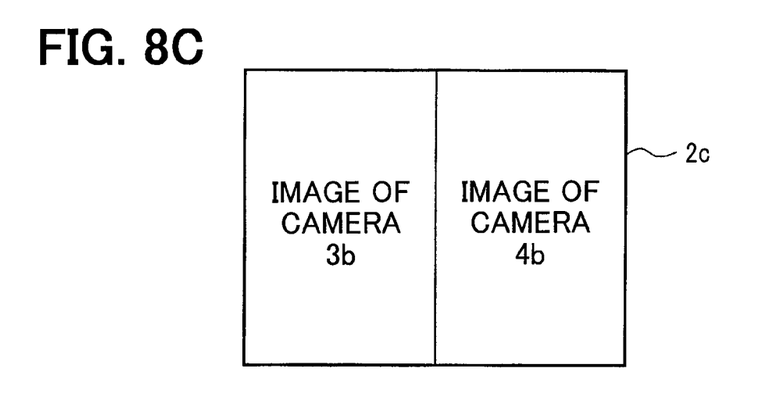
FIG. 8C is a diagram illustrating another example to change the display mode of the image.

When a user touches the screen with a finger of the user, the control portion 2a receives the operation detection signal from the display portion 2c and changes the display mode of the image based on the inputted operation detection signal. More specifically, as described in FIG. 6A and FIG. 6B, when the control portion 2a determines that a user touches a position of "A" on the screen, the control portion 2a enlarges and displays (zooms in) an image at the position of "A" as the center. FIG. 6B illustrates a situation after a position of "A" is touched. As described in FIG. 7A and FIG. 7B, when the control portion 2a determines that the user performs a drag on the screen from a position of "B" to a position of "C", the control portion 2a moves and displays an image according to an operation amount. The drag may be an operation that a finger on a screen is moved while the finger keeps contact with the screen. Incidentally, FIG. 7A illustrates the drag operation performed by the user. FIG. 7B illustrates a situation after the drag.

When the user operates the blinker lever 9 and the control portion 2a receives the operation detection signal from the operation detection portion 10, the control portion 2a changes the display mode of the image based on the inputted operation detection signal. More specifically, as described in FIG. 8A to FIG. 8C, when the blinker lever 9 is positioned to the neutral position, the control portion 2a displays an image imaged by the camera 3b at a left half part of the display area of the display portion 2c and displays an image imaged by the camera 4b at a right half part of the display area of the display portion 2c as described in FIG. 8A. From this situation, when the blinker lever 9 is rotated from the neutral position to the left turn position, the control portion 2a displays the image imaged by the camera 3b in the whole area of the display area of the display portion 2c as described in FIG. 8B. When the blinker lever 9 is returned to (goes back to) the neutral position from the left turn position, the control portion 2a returns the display mode before the blinker lever 9 is rotated from the neutral position to the left turn position. The control portion 2a displays the image imaged by the camera 3b at the left half part of the display area of the display portion 2c and displays the image imaged by the camera 4b at the right half part of the display area of the display portion 2c as described in FIG. 8C. When the blinker lever 9 is rotated from the neutral position to the right turn position and the blinker lever 9 is returned from the right turn position to the neutral position, the control portion 2a changes the display mode of the image similarly.

In the first embodiment, the image information is transmitted from the slave communication devices 3, 4 to the master communication device 2 by the differential transmission. The blinker information is transmitted from the master communication device 2 to the slave communication devices 3, 4 by changing the supply voltage to the power wires 5, 7. Accordingly, it may be possible to avoid an addition of a communication line as the system, and it may be possible to concurrently perform the transmission of the image information from the slave communication devices 3, 4 to the master communication device 2 and the transmission of the blinker information from the master communication device 2 to the slave communication devices 3, 4. It may be possible to perform the full-duplex communication.

In the blanking period when the image information is not transmitted, the supply voltage to the power wires 5, 7 is changed between the Vdd1 and the Vdd2. Accordingly, it may be possible to prevent a malfunction such as a case where a noise overlaps an image from occurring as the whole system, and it may be possible to assure a stable operation as the whole system. In the present embodiment, one of the supply voltages to the power wires 5, 7 is equal to the output voltage of the vehicle battery. The output voltage of the vehicle battery is supplied to the power wires 5, 7 as the one of the supply voltages. Accordingly, it may be possible to simplify a configuration of the voltage changeover circuits 2d, 2f that change the supply voltage to the power wires 5, 7.

Each of the LED drive circuits 3c, 4c has a timer function that measures the ON period and the OFF period of the respective LEDs 3d, 4d. The LED drive circuits 3c, 4c perform the blinking control of the LEDs 3d, 4d. In the blinking control, the LEDs 3d, 4d are repeatedly turned ON/OFF periodically. Accordingly, in a case where the master communication device 2 transmits the blinker information to the slave communication devices 3, 4 and the LEDs 3d, 4d are blinked, it may be only necessary to change the supply voltage to the power wires 5, 7 only at the time of a start and an end of a blinking period, and therefore, it may be possible to reduce frequency of changing the supply voltage to the power wires 5, 7. It may be possible to reduce the frequency for changing the supply voltage to the power wires 5, 7 as much as possible, and thus, it may be possible to increase noise tolerance.

Figure 5:
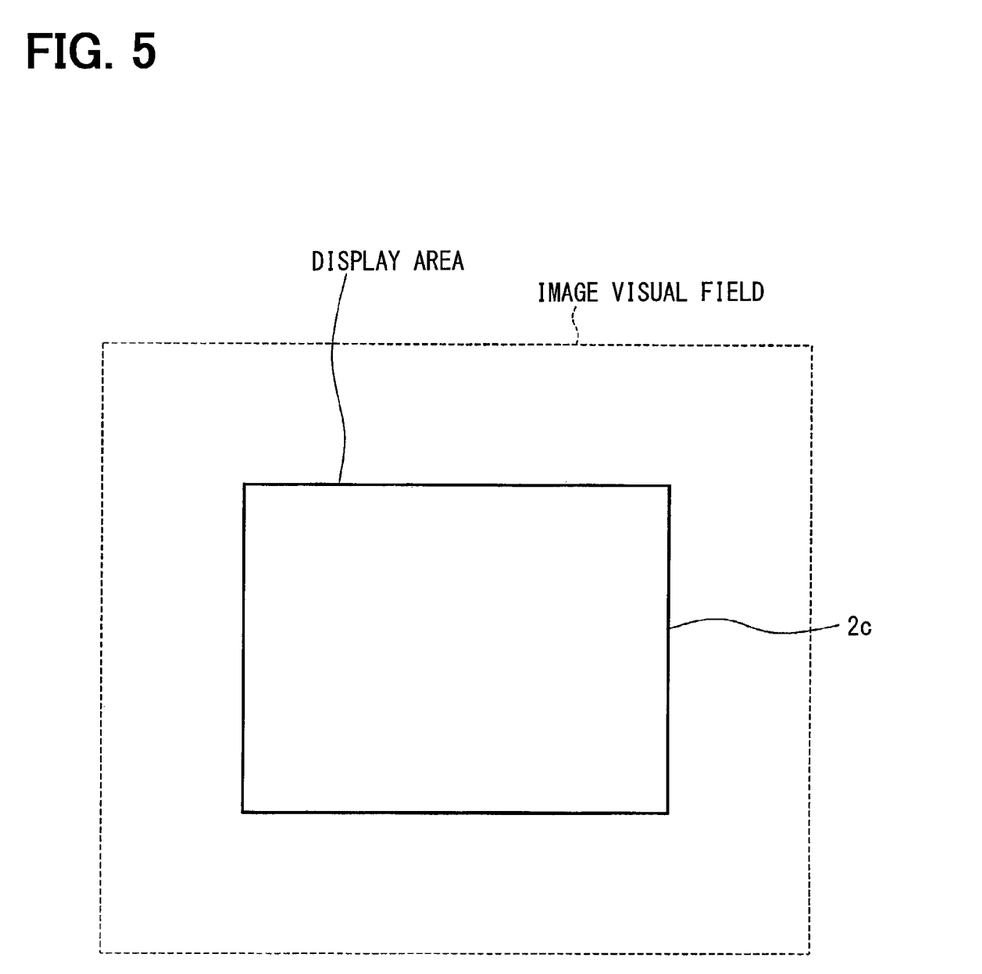
FIG. 5 is a diagram illustrating a relationship between an image visual field of a camera and a display area of a display portion.

By using a situation where the image visual field of the cameras 3b, 4b is wider than the display area of the display portion 2c, the display mode of the image is changed based on the operation of the user when the user performs an operation on the screen with the finger. Accordingly, without transmitting a signal indicating a change of an image obtaining direction of cameras from the master communication device 2 to the slave communication devices 3, 4, it may be possible to display the image of a required direction. When the user operates the blinker lever 9, the display mode of the image is changed based on the operation of the user so that the image corresponding to the direction to which the blinker lever 9 is rotated is displayed on the whole display area of the display portion 2c. Accordingly, without performing an operation for changing the display mode of the image by the user, it may be possible to automatically display the image of the direction to which the blinker lever 9 is rotated and it may be possible to suitably perform drive assistance.

Second Embodiment

A second embodiment will be explained with referring to FIG. 9 and FIG. 10A to FIG. 10C. Incidentally, an explanation of a part similar to the first embodiment will be omitted and a part different from the first embodiment will be explained. In the first embodiment, the LED drive circuits 3c, 4c in the slave communication devices 3, 4 have the timer function that measures the ON period and the OFF period of the LEDs 3d, 4d, respectively. In the second embodiment, the control portion 2a in the master communication device 2 has a timer function that measures the ON period and the OFF period of the LEDs 3d, 4d.

Figure 9:
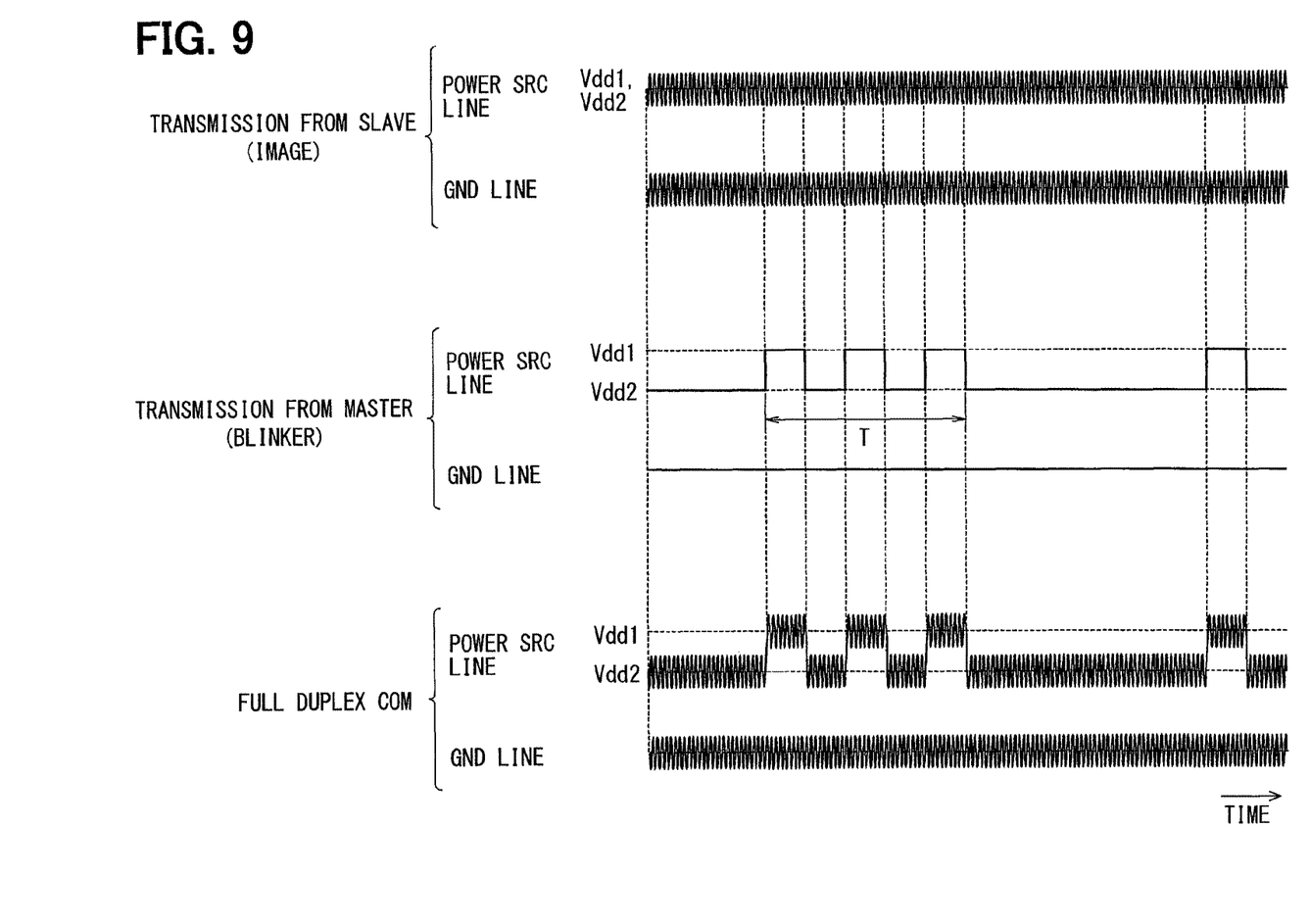
FIG. 9 is a diagram illustrating a waveform of a signal corresponding to a transmission from a slave communication device, a waveform of the signal corresponding to a transmission from a master communication device and a full-duplex communication in a second embodiment.
Figure 10A:
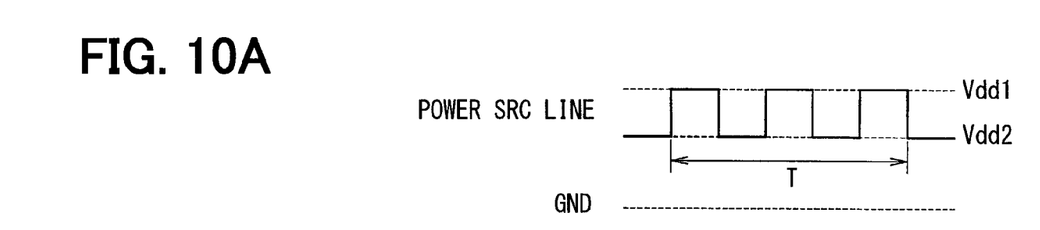
FIG. 10A is a diagram illustrating a waveform of blinker information in the second embodiment.
Figure 10B:
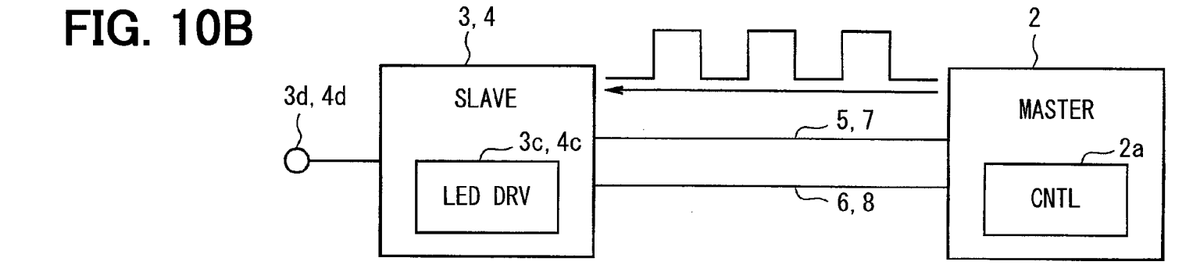
FIG. 10B is a diagram illustrating a waveform of blinker information and a blinking cycle of a LED in the second embodiment.
Figure 10C:
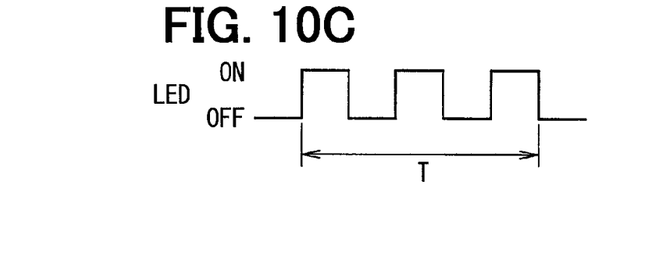
FIG. 10C is a diagram illustrating a blinking cycle of a LED in the second embodiment.

While the blinker lever 9 is rotated from the neutral position to the left turn position and the control portion 2a detects that the blinker lever 9 is positioned to the left turn position, the control portion 2a operates the timer function, so that the control portion 2a alternately outputs the first changeover command and the second changeover command to the voltage changeover circuit 2d. When the voltage changeover circuit 2d alternately receives the first changeover command and the second changeover command from the control portion 2a, the voltage changeover circuit 2d alternately supplies the Vdd1 and the Vdd2 to the communication IC 2e. In this case, with respect to the image information, the slave communication device 3 transmits the differential transmission having the Vdd1 as the center potential and the differential transmission having the Vdd2 as the center potential to the master communication device 2, alternately. The differential transmission having the Vdd1 as the center potential and the differential transmission having the Vdd2 as the center potential are changed and transmitted from the slave communication device 3 to the master communication device 2. According to this configuration, the blinker information including "0" or "1" is transmitted from the master communication device 2 to the slave communication device 3. The LED drive circuit 3c turns on the LED 3d when a signal inputted from the communication IC 3a is equal to a high level state "1". The LED drive circuit 3c turns off the LED 3d when the signal inputted from the communication IC 3a is equal to a low level state "0". In the second embodiment, it may be possible to realize a similar effect realized in the first embodiment and to implement a full duplex communication.

Other Embodiments

It should be noted that the power line communication system and the master communication device are not limited to the present embodiments, and the power line communication system and the master communication device may be modified and/or expanded as following, for example.

The power line communication system is not limited to a power line communication system transmitting image information of an electronic mirror mounted to a vehicle, and may be applied to another power line communication mounted to a vehicle. Furthermore, the power line communication system may be applied to another power line communication system mounted to a different target other than a vehicle.

In the present embodiment, the output voltage of the vehicle battery is equal to the Vdd1 and the output voltage obtained by stepping down the output voltage of the vehicle battery with the step down circuit is equal to the Vdd2. Each of the Vdd1 and the Vdd2 may be obtained by different step down circuits and the different step down circuits step down the output voltage of the vehicle battery to generate the Vdd1 and the Vdd2, respectively.

In the present embodiments, the blinker information controlling ON/OFF of the LEDs 3d, 4d is transmitted from the master communication device 2 to the slave communication devices 3, 4. Another information may be transmitted from the master communication device 2 to the slave communication devices 3, 4. For example, information controlling ON/OFF of an auxiliary light source when the cameras 3b, 4b take an image may be transmitted from the master communication device 2 to the slave communication devices 3, 4. Information controlling ON/OFF of a fogging prevention function of the cameras 3b, 4b may be transmitted from the master communication device 2 to the slave communication devices 3, 4.

In the present embodiments, the image information imaged by the cameras 3b, 4b is transmitted from the slave communication devices 3, 4 to the master communication device 2. In addition to the image information, ON/OFF information (operation information indicating an operation status of a drive object) of the LEDs 3d, 4d may be transmitted from the slave communication devices 3, 4 to the master communication device 2. According to this configuration, it may be possible to perform processing of the master communication device 2 interlocking with the ON/OFF of the LEDs 3d, 4d. The interlocking processing may be display processing, for example. The ON/OFF information of the LEDs 3d, 4d may be notified to a user, and in this case, it may be possible that the user confirms whether a blinking operation of the LEDs 3d, 4d is suitably performed.

In the present embodiment, the master communication device 2 changes the supply voltage supplied to the power wires 5, 7 to the Vdd1 and the Vdd2 in two steps. The supply voltage supplied to the power wires 5, 7 may be changed in three or more steps. As described in the present embodiments, in a case where the supply voltage are changed to the Vdd1 and the Vdd2 as the two steps, "1" is assigned to the Vdd1 and "0" is assigned to the Vdd2, for example. When the supply voltage may be changed in, for example, four steps of a Vdd1, a Vdd2, a Vdd3, and a Vdd4, "11" may be assigned to the Vdd1, "10" may be assigned to the Vdd2, "01" may be assigned to the Vdd3, and "00" may be assigned to the Vdd4, for example. In this configuration, it may be possible to increase transmission speed from the master communication device 2 to the slave communication device 3. For example, in a case where the supply voltage is changed in the four steps of the Vdd1 to the Vdd4, a transmission of information between the master communication device 2 and the slave communication device 3 may be performed with the Vdd1 and the Vdd2, and a transmission of information between the master communication device 2 and the slave communication device 4 may be performed with the Vdd3 and the Vdd4. According to this configuration, it may be possible that the master communication device 2 has a single communication IC and the slave communication devices 3, 4 have a single communication IC in common. The voltage changeover circuits 2d, 2f may include a booster circuit. Alternatively, the voltage changeover circuits 2d, 2f may include a booster circuit and a step down circuit.

A display control of an image performed by the master communication device 2 may be a flick operation, a pinch in operation, a pinch out operation or the like in addition to the drag operation performed by the user on the screen. The flick operation corresponds to a movement that a finger lightly sweeps on a screen. The pinch in operation corresponds to a movement that two fingers touch the screen and the interval between the two fingers is narrowed while touching. The pinch out operation corresponds to a movement that two fingers touch the screen and the interval between the two fingers expands while touching. In each operation, based on the operation performed by the user, the display mode of the image may be changed. For example, when the user performs the flick operation on the screen, the image may be moved according to the operation amount. When the user performs the pinch in operation, the image may be reduced and displayed according to the operation amount (scale down). When the user performs the pinch out operation, the image may be enlarged and displayed according to the operation amount (scale up).

In the present embodiment, when the blinker lever 9 is positioned to the neutral position, the image imaged by the camera 3b is displayed on the left half part of the display area of the display portion 2c and the image imaged by the camera 4b is displayed on the right half part of the display area of the display portion 2c. A display portion that displays the image imaged by the camera 3b may be separated from a display portion that displays the image imaged by the camera 3b. For example, the display portion that displays the image imaged by the camera 3b may be provided to a left door, and the display portion that displays the image imaged by the camera 4b may be provided to a right door.

Incidentally, the control portion 2a may be an example of a control information generation portion, a display control portion, a first operation specifying portion, and a second operation specifying portion. The image processing IC 2b may be an example of an image processing portion. The voltage changeover circuits 2d, 2f may be an example of a voltage changeover portion. The communication ICs 2e, 2g may be an example of a master side transceiver. The communication ICs 3a, 4a may be an example of a slave side transceiver. The cameras 3b, 4b may be an example of an image portion. The LED drive circuits 3c, 4c may be an example of a drive portion. The LEDs 3d, 4d may be an example of a drive object and a light emitting device. The blinker lever 9 may be an example of an operation apparatus.

While the power line communication system and the master communication device have been described with reference to embodiments thereof, it is to be understood that the disclosure is not limited to the embodiments and constructions. The power line communication system and the master communication device are intended to cover various modification and equivalent arrangements. In addition, while the various combinations and configurations, other combinations and configurations, including more, less or only a single element, are also within the spirit and scope of the present disclosure.

What is claimed is:

1. A power line communication system comprising:
   a master side transceiver of a master communication device;
   a slave side transceiver of a slave communication device;
   a power wire; and
   a ground wire,
   wherein:
   the master communication device includes a voltage changeover portion that changes supply voltage supplied to the power wire in a plurality of steps;
   the master side transceiver is connected to the slave side transceiver through the power wire and the ground wire;
   the slave side transceiver transmits first information to the master side transceiver by a differential transmission; and
   the voltage changeover portion changes the supply voltage to the power wire in the plurality of steps so as the master side transceiver to transmit second information to the slave side transceiver.

2. The power line communication system according to claim 1, wherein
   when the slave side transceiver does not transmit the first information to the master side transceiver, the voltage changeover portion changes the supply voltage, which is supplied to the power wire, in the plurality of steps.

3. The power line communication system according to claim 1, wherein
   the voltage changeover portion uses output voltage of a vehicle battery as the supply voltage, which is supplied to the power wire.

4. The power line communication system according to claim 1, wherein:
   the master communication device includes a control information generation portion that generates control information of a drive object, the control information corresponding to the second information;
   the slave communication device includes a drive portion that controls an operation of the drive object;
   the master side transceiver transmits the control information, which is generated by the control information generation portion, to the slave side transceiver; and
   the drive portion controls the operation of the drive object based on the control information, which is transmitted from the master side transceiver to the slave side transceiver.

5. The power line communication system according to claim 4, wherein:
   the control information generation portion generates the control information that indicates whether an changeover period of the drive object is valid or not; and
   while the master side transceiver transmits the control information indicating that the changeover period of the drive object is valid to the slave side transceiver, the drive portion controls to turn on and off of the drive object.

6. The power line communication system according to claim 4, wherein:
   the control information generation portion generates the control information indicating an on and off status of the drive object;
   while the master side transceiver transmits the control information that indicates the on status of the drive object, the drive portion controls the drive object to be the on status; and
   while the master side transceiver transmits the control information that indicates the off status of the drive object to the slave side transceiver, the drive portion controls the drive object to be the off status.

7. The power line communication system according to claim 4, wherein:
   the drive object corresponds to a light emitting device that provides a blinker of a vehicle;
   the control information generation portion generates blinker information that indicates a turning on and off of the light emitting device as the control information; and
   the drive portion controls the light emitting device to turn on and off.

8. The power line communication system according to claim 4, wherein:
   the slave side transceiver transmits operation information to the master side transceiver, the operation information corresponding to the first information; and
   the operation information indicates an operation status of the drive object.

9. The power line communication system according to claim 1, wherein:
   the slave communication device includes an image portion;
   the master communication device includes an image processing portion;
   the slave side transceiver transmits image information that is imaged by the image portion to the master side transceiver, the image information corresponding to the first information; and
   the image processing portion of the master side transceiver performs image processing on the image information, which is transmitted from the slave side transceiver.

10. The power line communication system according to claim 9, wherein:
    the master communication device includes a display portion that has a predetermined display area; and
    the master communication device further includes a display control portion that causes the display portion to display an image that is generated from the image information by the image processing of the image processing portion.

11. The power line communication system according to claim 10, further comprising a first operation specifying portion specifying an operation that a user performs on a screen of the display portion, wherein the display control portion changes a display mode of the image, which is generated by the image processing portion, based on the operation specified by the first operation specifying portion.

12. The power line communication system according to claim 10, further comprising a second operation specifying portion specifying an operation that a user performs to an operation apparatus, wherein the display control portion changes a display mode of the image, which is generated by the image processing portion, based on the operation specified by the second operation specifying portion.

13. A master communication device comprising:

a master side transceiver connected to a slave side transceiver of a slave communication device through a power wire and a ground wire; and a voltage changeover portion changing supply voltage, which is supplied to the power wire, in a plurality of steps, wherein:

the slave side transceiver transmits first information to the master side transceiver by a differential transmission; and the voltage changeover portion changes the supply voltage to the power wire in the plurality of steps so as the master side transceiver to transmit second information to the slave side transceiver.

\* \* \* \* \*